(No Model.)
J. VALIND.
SLED BRAKE.
No. 393,731. Patented Nov. 27, 1888.
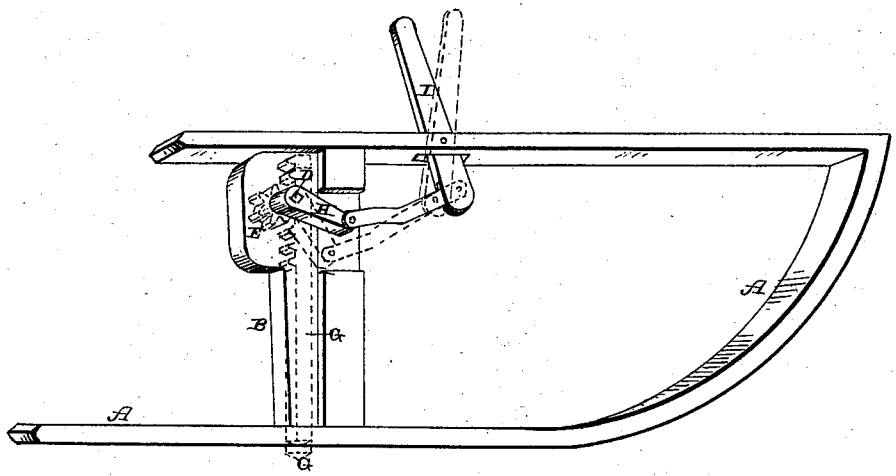
Witnesses.
L. F. Gardner.
Allen S. Pattison.
Inventor
Jos. Valind,
per F. A. Lehmann, atty.

UNITED STATES PATENT OFFICE.

JOSEPH VALIND, OF MASONVILLE, MICHIGAN.

SLED-BRAKE.

SPECIFICATION forming part of Letters Patent No. 393,731, dated November 27, 1888.

Application filed May 26, 1888. Serial No. 275,179. (No model.)

*To all whom it may concern:*

Be it known that I, JOSEPH VALIND, of Masonville, in the county of Delta and State of Michigan, have invented certain new and useful Improvements in Brake Attachments for Sleds or Sleighs; and I do hereby declare the following to be a full, clear, and exact description of the invention, such as will enable others skilled in the art to which it pertains to make and use it, reference being had to the accompanying drawing, which forms part of this specification.

My invention relates to an improvement in brake attachments for sleds or sleighs; and the object of my invention is to inclose the operating parts of the brake in a box or casing, so as to protect them from ice and snow, and which can be applied to all sleds of the ordinary construction.

The accompanying drawing represents a perspective of a sled-runner having my invention attached thereto.

A represents an ordinary sled-runner, and B a box or casing, which is placed between the runner and the rave and secured in position by means of clamping devices of any suitable description. In this box or casing are placed the operating parts of the brake, which are thoroughly protected from ice, snow, and dirt, so that they cannot become clogged in such a manner that they cannot be operated.

In the sides of this box or casing are journaled the shaft D and the pinion E, which pinion meshes with the rack formed upon the upper end of the vertical brake-rod G. To the outer end of the shaft is secured the arm or crank H, by means of which the pinion is partially revolved, and the lower end of the brake-rod is made to move vertically through an opening in the runner, so that the lower end of the brake-rod will not engage with the ground or be forced downward, so as to engage with the ground and thus lock the sleigh. To the outer end of the arm or crank is secured a connecting-rod, and the front end of the connecting-rod is secured to the lever I, which may be attached to the rave or any other portion of the sled or sleigh. When only a single brake is used, as here shown, but a single connecting-rod is used; but in case a brake is used upon each runner, then the connecting-rods are connected together at their front ends and then connected to the lower end of the lever. In some cases ropes may be used instead of the connecting-rods, but I do not limit myself to any details of construction in this respect. The lever will be held in any desired position by means of a rack-bar attached to the sleigh, and in this manner the brakes can be locked rigidly in position, either to prevent the team from starting while upon level ground or while the sleigh is going down or up hill, and thus allow the animals to rest.

Having thus described my invention, I claim—

The combination, with a sled or sleigh, of an inclosing box or case which is applied between the rave and the runner, with a vertically-moving brake-rod, the pinion, the arm, the lever connected to the pinion, the connecting-rod, and the lever, substantially as shown and described.

In testimony whereof I affix my signature in presence of two witnesses.

JOSEPH VALIND.

Witnesses:
  MARY E. NORTHUP,
  F. H. VAN CLEVE.